(12) United States Patent
Johnson (10) Patent No.: US 9,687,105 B2
(45) Date of Patent: Jun. 27, 2017

(54) INSULATED MULTIFUNCTIONAL PORTABLE BEVERAGE BREWING DEVICE

(71) Applicant: Joshua Fors Johnson, Telluride, CO (US)

(72) Inventor: Joshua Fors Johnson, Telluride, CO (US)

(73) Assignee: Big Spoon Productions, LLC, Denver, CO (US)

( * ) Notice: Subject to any disclaimer, the term of this patent is extended or adjusted under 35 U.S.C. 154(b) by 214 days.

(21) Appl. No.: 14/480,631

(22) Filed: Sep. 8, 2014

(65) Prior Publication Data

US 2015/0072058 A1 Mar. 12, 2015

Related U.S. Application Data

(60) Provisional application No. 61/874,906, filed on Sep. 6, 2013.

(51) Int. Cl.
*A47J 31/00* (2006.01)
*A47J 31/06* (2006.01)
*A47J 31/44* (2006.01)
*A47J 41/00* (2006.01)

(52) U.S. Cl.
CPC ......... *A47J 31/005* (2013.01); *A47J 31/0615* (2013.01); *A47J 31/4403* (2013.01); *A47J 31/446* (2013.01); *A47J 41/00* (2013.01); *A47J 41/0077* (2013.01); *A47J 41/0088* (2013.01)

(58) Field of Classification Search
CPC .. A47J 31/005; A47J 31/0615; A47J 31/4403; A47J 31/446; A47J 41/00; A47J 41/0077; A47J 41/0088
See application file for complete search history.

(56) References Cited

U.S. PATENT DOCUMENTS

| | | | | |
|---|---|---|---|---|
| 1,504,500 A | * | 8/1924 | Pizzoglio | A47J 31/0576 99/315 |
| 1,757,583 A | | 5/1930 | Novolny | |
| 1,840,985 A | | 1/1932 | Topper | |
| 2,809,577 A | * | 10/1957 | Sill | A47J 31/10 99/290 |
| 3,388,804 A | * | 6/1968 | Hester | A47J 31/06 210/470 |
| 3,651,918 A | * | 3/1972 | Herzog | B65G 67/00 198/519 |

(Continued)

FOREIGN PATENT DOCUMENTS

DE 3504441 * 8/1986

OTHER PUBLICATIONS

R-Values of Materials. 2016. http://inspectapedia.com/insulation/Insulation_Values_Table.php#PolyUre.*

(Continued)

*Primary Examiner* — Anthony Weier (74) *Attorney, Agent, or Firm* — Blank Rome LLP (57) ABSTRACT

A portable insulated beverage brewing device 10 for liquids and gravity fed method for brewing. A device 10, with lid 14 and vessel 12, may house insulation 52A and 52B, liner reservoir 50A and 50B, and filter 28 to brew hot or cold liquids and contain hot or cold liquids for controlled dispensing 26. A large capacity filter 28 secures inside the vessel 12 accepting brew mixtures for gravity fed brewing method.

20 Claims, 5 Drawing Sheets

(56) References Cited

U.S. PATENT DOCUMENTS

| | | | |
|---|---|---|---|
| 4,231,876 A | | 11/1980 | Zimmermann et al. |
| D276,890 S | | 12/1984 | Hancher |
| 4,656,932 A | | 4/1987 | Kopp |
| 4,721,214 A | * | 1/1988 | Wandel ................ A47G 19/127 215/13.1 |
| 5,064,533 A | * | 11/1991 | Anson ................ B01D 29/085 210/232 |
| D344,657 S | | 3/1994 | Knopp |
| 5,560,284 A | * | 10/1996 | Weidman ............ A47J 31/0573 99/281 |
| 5,852,966 A | | 12/1998 | Hursh |
| 5,971,218 A | | 10/1999 | Le |
| 6,123,010 A | * | 9/2000 | Blackstone ............ A47J 31/005 99/279 |
| 6,176,562 B1 | | 1/2001 | Hart |
| 6,497,818 B1 | | 12/2002 | Bunn |
| 6,499,628 B1 | * | 12/2002 | Lassota ................ A47J 31/50 222/1 |
| 6,783,034 B1 | | 8/2004 | Brent |
| 7,464,638 B2 | | 12/2008 | Tremblay |
| D584,109 S | | 1/2009 | Krog |
| D602,301 S | | 10/2009 | Romandy |
| 7,913,874 B2 | | 3/2011 | Gruskin et al. |
| 7,958,816 B2 | | 6/2011 | Lin |
| D713,193 S | | 9/2014 | English |
| 2005/0199130 A1 | * | 9/2005 | Palese ................ A47J 31/005 99/279 |
| 2005/0284303 A1 | | 12/2005 | Zell et al. |
| 2008/0216663 A1 | * | 9/2008 | Williamson .......... A47J 31/467 99/279 |
| 2010/0199852 A1 | * | 8/2010 | Webster .............. A47J 31/0605 99/306 |
| 2011/0139672 A1 | | 6/2011 | Burgess et al. |
| 2013/0216673 A1 | * | 8/2013 | Storek .................... A47J 27/62 426/509 |
| 2016/0058242 A1 | * | 3/2016 | Viet-Doan ............ A47J 31/005 99/283 |

OTHER PUBLICATIONS

Abstract for CN 201750858 published Feb. 2011 (China).*
Derwent Abstract of DE3504441 published Aug. 1986.*
The Coffeeboxx: The World's Toughest Coffee Maker by Oxx; https://www.kickstarter.com/projects/1217364508/the-coffeeboxxtm-the-worlds-toughest-coffee-maker, Nov. 2014, 29 pages.
AC Shilton, This Coffee Machine is Indestructible; http://www.outsideonline.com/outdoor-gear/gear-shed/pro-shop/This-Coffee-Machine-Is-Indestructible.html, Nov. 21, 2014, 5 pages.

* cited by examiner

INSULATED MULTIFUNCTIONAL PORTABLE BEVERAGE BREWING DEVICE

CROSS-REFERENCE TO RELATED APPLICATION

This application claims the benefit of Provisional Patent Application No. 61/874,906, filed on Sep. 6, 2013 by the present inventor, Joshua Fors Johnson.

FEDERALLY SPONSORED RESEARCH

Not applicable.

SEQUENCE LISTING OR PROGRAM

Not applicable.

BACKGROUND

There are limited options utilizing a gravity fed, pour over coffee making method to efficiently brew multiple servings of coffee while camping or recreating outdoors. Commonly, outdoor coffee makers can only make a limited number of servings in one brew cycle or are designed to serve just one individual. These devices are inefficient for brewing coffee for both larger and smaller groups or for individuals desiring more than a few cups of coffee without having to repeat multiple steps and brew cycles. Other devices like percolators and press pot coffee makers can produce an undesirable astringent cup of coffee because their brew techniques can be prone to either under or over-extracting the coffee. Moreover, these devices either require a heat source to keep the brewed coffee hot or lack the insulation necessary for ensuring beverages stay hot or cold for extended periods.

Camping coffee pots, percolators, and press pot style coffee makers are often comprised of mechanical parts that are susceptible to bending or braking, making them insufficiently durable for extended use outdoors. Moreover, thoroughly cleaning these coffee makers requires cumbersome removal of parts and then reassembly that provide additional opportunities for damaging their parts. Several types of outdoor coffee systems require bulky propane cylinders, heavy stovetops, or electrical components in order to heat the coffee or boil the water that are difficult to transport, prone to failing, and inapt for backcountry travel. Although some beverage dispensers or water coolers provide means for insulating cold beverages, they are limited to just insulating cold liquids and do not provide a means to keep beverages like coffee or tea hot or offer brewing capabilities.

Therefore, there is a need for a durable outdoor portable brewing device that efficiently makes large quantities of great tasting coffee utilizing a pour over brewing method, while advantageously holding and insulating both hot and cold beverages for consuming immediately or later, thus reducing or eliminating some of the problems discussed above. Disclosed herein are different embodiments of such device.

SUMMARY OF THE INVENTION

The present embodiment in general terms concerns a portable device for making coffee or tea and insulating any hot or cold beverage. The device utilizes a gravity fed brewing method for making pour over style coffee or tea in quantities to serve large and small groups while in the backcountry or at home. In accordance with one embodiment, an insulated multifunctional portable beverage brewing device and method for making the same comprising, a vessel that houses an insulation chamber and an interior liner wherein a removable filter apparatus rests. The insulation chamber surrounds the interior liner for keeping beverages either hot or cold. A detachable lid covers the vessel opening and provides access to the interior vessel when removed. A removable filter apparatus capable of holding and brewing large quantities of brew mixtures within one brew cycle. The gravity fed pour over brewing method naturally filters and fully extracts the ground coffee or tea, without under or over extracting the desired brew mixture. A filter seal attaches around the top edge of the filter apparatus to both seal the filter into place within the interior liner and to shield materials from escaping over the filter apparatus into the bottom of the interior liner reservoir. A controlled dispensing device attaches towards the bottom of the vessel for releasing beverages and a liquid viewing gage connects from the interior liner reservoir to the external vessel and rests above the controlled dispensing device to show the amount of liquid inside the interior reservoir.

The present embodiment of the removable filter apparatus and the interior liner provide the capacity to brew up to a gallon of tea or coffee using a gravity fed pour over brewing method for serving both large and small groups. Accordingly, the reader will see that one advantage of the device is the versatile brewing capacity makes it adept for different groups of people in diverse settings, such as, camping/rafting users, lodges, hotels, restaurants and office businesses, construction sites, boats, cafes, bars, and sporting events. The present embodiment of the device can utilize suitable alternative materials and configurations. In accordance with other embodiment, the device is designed to accommodate interior liners with brewing and insulating chamber capacities to suite the desired quantities of serving while in the backcountry, coffee shops, restaurants, or for home use. Advantageously, an alternative embodiment of the exterior vessel comprises of stainless steel making an attractive gravity fed pour over brewing device ideally suited for any coffee shop, cafes, restaurants, or other similar establishments.

Other advantages of one or more aspects of the device is that the filter apparatus has the capability to hold substantial amounts of brew mixtures for making larger quantities of brew liquids within one brew cycle than other pour over style coffee makers used for outdoor recreation. The filter apparatus contemplated in this embodiment is comprised of a durable porous mesh with a plurality of holes that allow liquids to flow through while retaining the brew materials. Advantageously, the filter apparatus is reusable allowing for extensive use without replacing, thus eliminating buying large quantities of single-use paper filters that must be thrown away or packed out of the backcountry for later disposal. Therefore, the filter apparatus embodiment is both economical and environmentally friendly.

The present embodiment of the device is made of materials that are extremely durable and temperature tolerant that reduces wearing and potential for replacement parts while providing ease of transport and use in rugged environments. Additionally, the device eliminates unnecessary components or fragile elements making the device practical for extensive outdoor and indoor use. Another beneficial aspect of the device's durability is that its components are all recessed and thus better protected from sheering or potentially breaking during use and transport.

Advantageously, the present embodiment may also be used for making cold brewed coffee by simply substituting cold water for hot water during the brew cycle. Traditionally, coffee shops drip-brew their coffee hot before adding ice to create iced coffee. This technique extracts acids from coffee beans creating a bitter tasting cup of cold coffee. The current embodiment's brewing method extracts less acid, thus creating a smoother and sweeter cold coffee. The portable brewing device also holds the cold brewed coffee in the interior reservoir at a colder temperature than the temperature outside the vessel. Additionally, users can add ice to the interior liner and keep any beverage iced for extended periods. Coffee shops can utilize the current embodiment's method for making tasty cold brew coffee for multiple customers at once.

Another advantage is the multifunctional aspects of the device wherein the device not only brews and insulates coffee and tea, but also serves an insulation vessel for other liquids like water, juices, and mixed beverages. Thus, the device serves as an all in one portable beverage insulator and brewing device. Another advantage of this embodiment is the vessel can be used for dry-storage of brew mixtures, cups, or other utensils while boating down the river, traveling by car, or other transportation means.

In addition to the above mentioned, other embodiments, advantages, features, and details of this disclosure and the manner in attaining them as well as the other embodiments will be more completely appreciated by reference to the accompanying drawings, summarized briefly below, the following detailed description, and the appended claim. Those skilled in the art will appreciate that the formulation for the underlying device may be utilized for the designing of other embodiments, methods, and functions for carrying out one or more of the multiple purposes of the present embodiment. Therefore, it is important to regard the claims as including such equivalents to the extent they encompass the spirit of the present embodiment.

DETAILED DESCRIPTION

Figure 1:
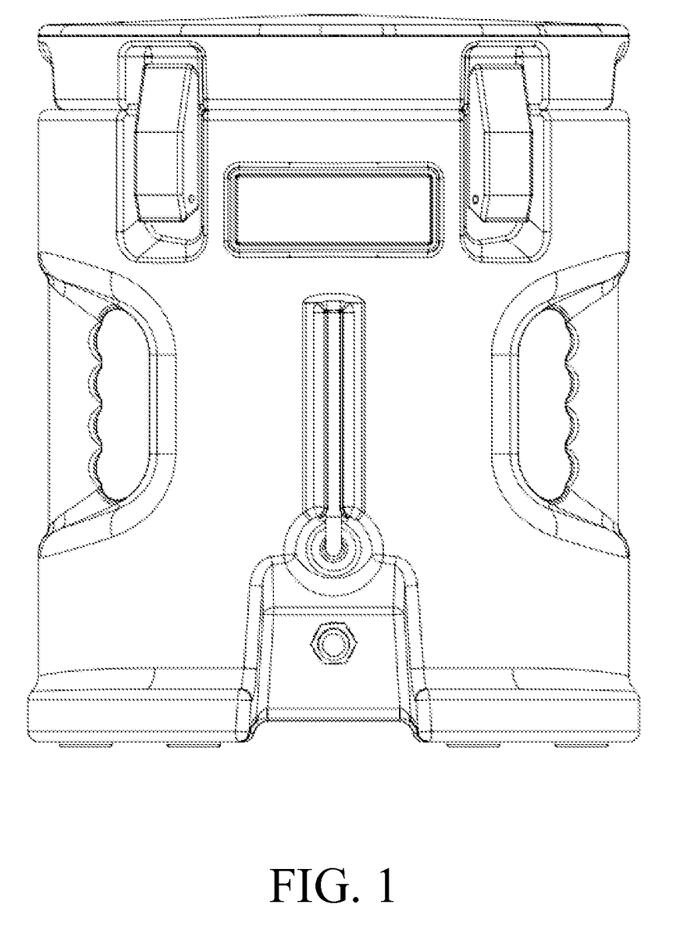
FIG. 1 is a front perspective view of one embodiment of the device.

The particular embodiments are shown by way of illustration and not as limitations of the invention. The following description of the present embodiment references the figures in which like reference numerals refer to like parts throughout. FIG. 1 generally illustrates one embodiment of an insulated multifunctional portable beverage brewing device and method for making the same.

Figure 2:
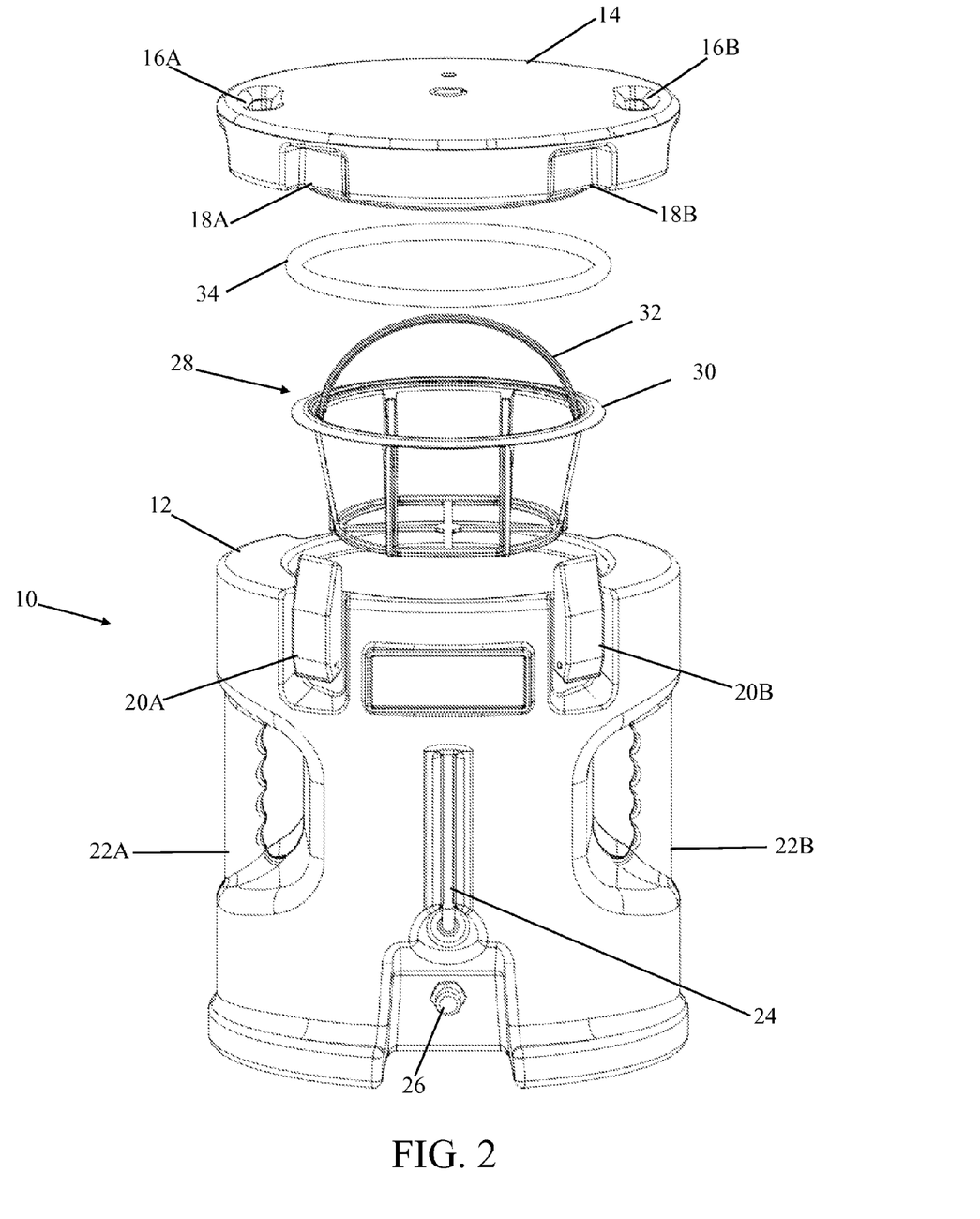
FIG. 2 is a slight overhead perspective of one embodiment of the device illustrating various elements removed above the device.

Referring to FIG. 2, the presently contemplated embodiment of the device 10 comprising of an exterior vessel 12 constructed of highly durable, heat tolerant, non-leaching BPA free materials. In accordance with other embodiments, the exterior of the vessel 10 is composed of stainless steal, aluminum, titanium, or similar materials or a combination thereof. In another embodiment, certain aspects of the device 10 are translucent to view the liquid levels within the vessel 12. FIGS. 1 and 2 offers a general depiction of the overall shape of the current embodiment. Other embodiments of the portable brewing device 10 can be cubed shaped, square, rectangular, oval, rounded, or a combination thereof. The exterior of the vessel 12 has two complimentary vessel handles 22A and 22B that are flush with the exterior vessel 12 and having finger indentations for manipulating and transporting the device 10. There is an opening between the vessel 12 and each vessel handle 22A and 22B where a strap or other securing means can be passed through for mounting or attaching for transport. In other embodiments, the vessel handles 22A and 22B can be configured at different angles and locations, collapsible, or fold in to rest on the device 10 and fold out for handling.

Figure 4:
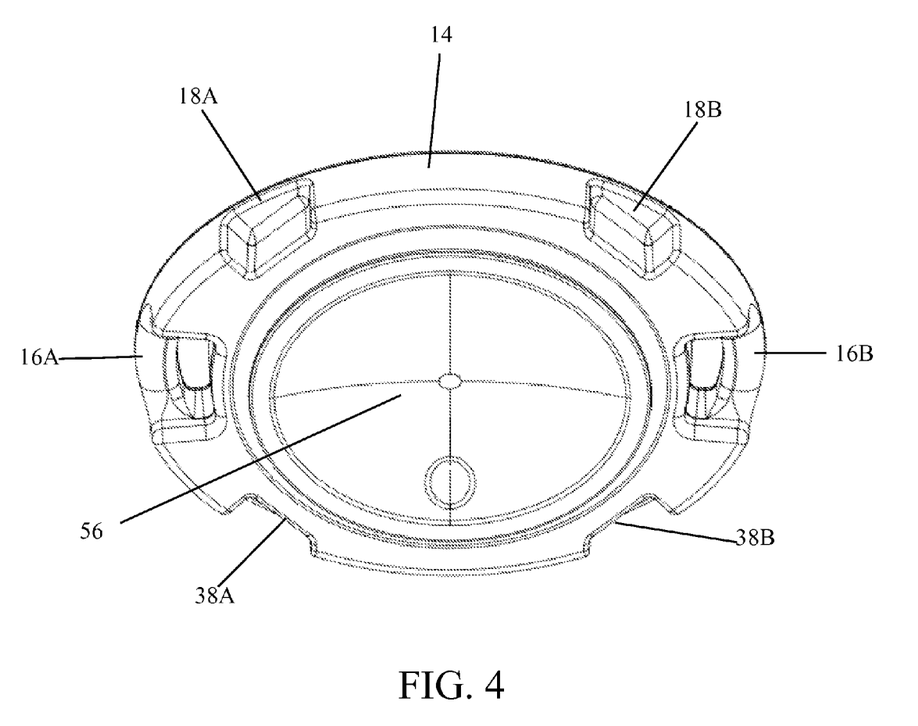
FIG. 4 is a perspective view of the underside of one embodiment of the lid.
Figure 5:
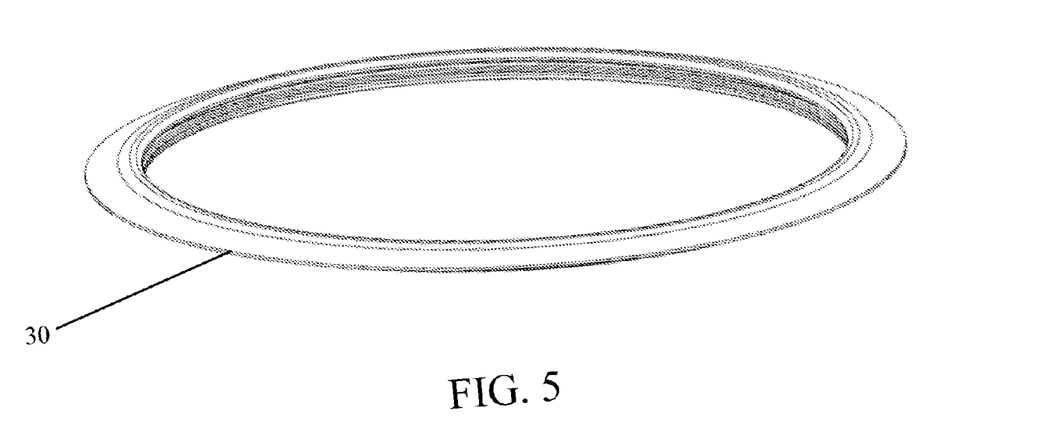
FIG. 5 is a perspective view of the filter apparatus seal.

As illustrated in FIG. 2, the device 10 has a detachable lid 14 with opposing hand slots 16A and 16B to assist with removing and handling the lid 14. There are a plurality of recessed latching devices 20A and 20B that can be mounted on multiple sides and at multiple angles of the vessel 12 that extend to the lid 14 recesses 18A and 18B for securing the lid 14 tightly to the vessel 12. The underside side of the lid 14 contains an undercut that accepts a tubular silicone gasket 34 that provides an airtight seal between the lid 14 and the vessel 12. The lid 14 having a plurality of recessed spaces 18A and 18B wherein the plurality of latching devices 20A and 20B may attach. Referring to FIG. 4, an underside angle of the lid 14 shows the general location for the gasket 34. FIG. 4 also providing a more comprehensive view of the various positions for the plurality of recessed spaces 18A and 18B as well as 38A and 38B wherein the latching devices may attach. Referring again to FIG. 2, the recessed aspects of 18A and 18B and 20A and 20B help prevent the plurality of latching devices 20A and 20B from being damage. When the lid 14 is detached, the latching devices 20A and 20B swing to a downward position and lay within the recessed aspects on the exterior of the vessel. In alternative embodiments, the detachable lid 14 can attach to the vessel 12 with alternative latching systems, flexible rubber, clamps, screwing on with female and opposing male threading, magnetism, or other like mechanisms or a combination thereof.

FIG. 2 illustrates one embodiment of the filter apparatus 28 removed from inside the vessel 12. The filter apparatus 28 having a folding handle 32 (shown folded up in FIG. 1) and a filter seal 30. The lower exterior vessel 12 has a controlled dispensing device 26 to dispense liquids from the vessel 12 at a controlled rate. The controlled dispensing device attaches into the vessel 12 with a bulkhead fitting or similar fitting device that connects to the lower interior liner 50B (shown on FIG. 3) with a gasket and nut or similar device. The controlled dispensing device 26 tolerates high temperatures and does not leach BPA's. A liquid viewing gage 24 connects from the interior liner 50B (shown on FIG. 3) out to the lower exterior vessel 12 and above the controlled dispensing device 26 for displaying amounts of liquid contained therein. The liquid viewing gage 24 can be constructed of translucent silicone tubing material that tolerates high temperatures and is shatter resistant. The liquid viewing gage 24 attaches to a bulkhead fitting or similar device that intersects the insulation chamber 52A and 52B (shown on FIG. 3) and fastens inside the interior liner 50B (shown on FIG. 3) with a gasket and nut or like devices. In other embodiments, the liquid viewing gage 24 can be embedded within the device 10 and still visible with a translucent design.

Figure 3:
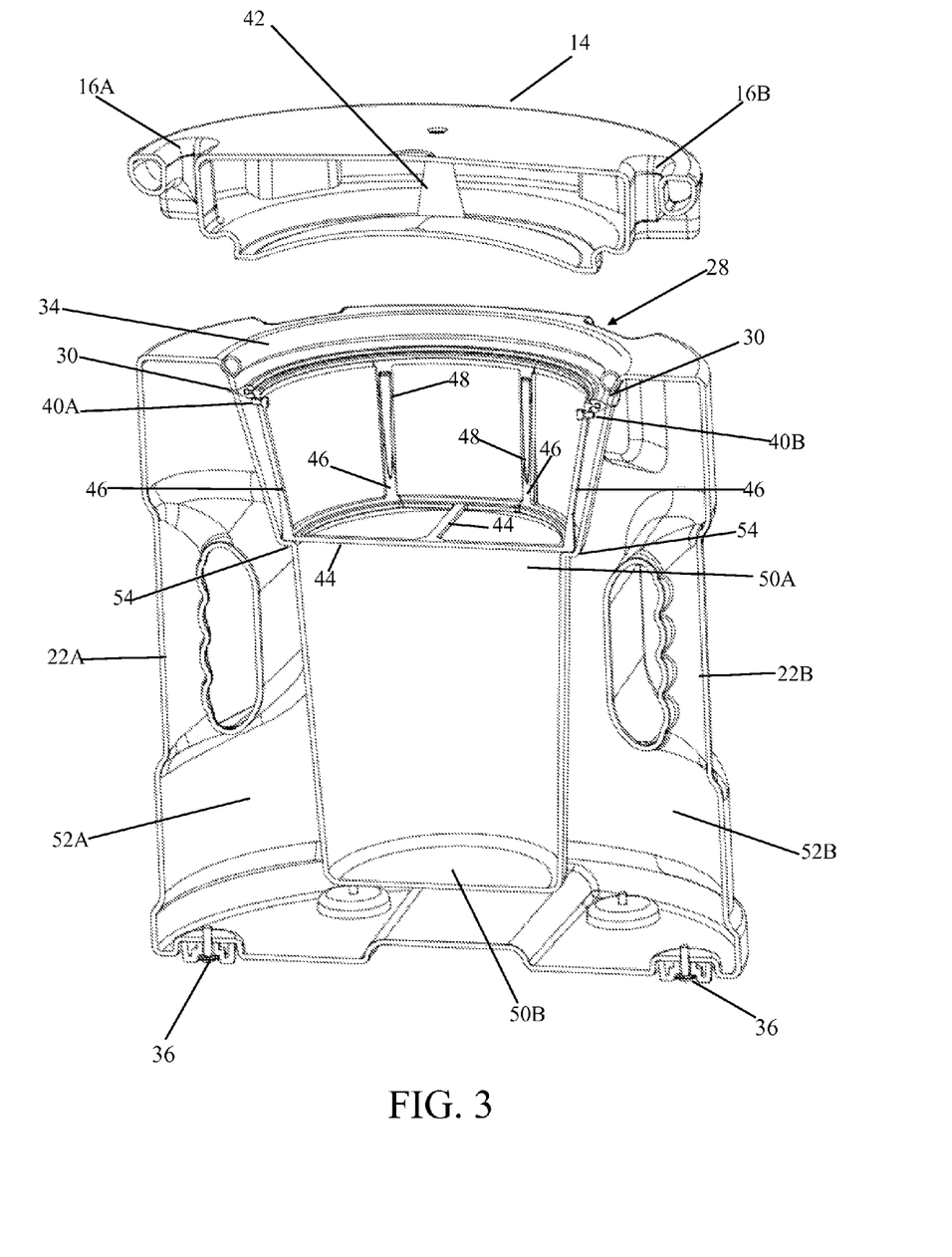
FIG. 3 is a cross-section perspective view of one embodiment illustrating the interior elements of the device.

FIG. 3 shows a cross-section perspective view inside the vessel 12, the lid 14, and the filter apparatus 28. The interior of the lid 14 contains high-density foam for retaining heat and maintaining insulation at the top of the device 10. Alternative materials are suited for insulating other embodiments of the lid 14, such as vacuum insulation or similar insulation means. The top of the lid 14 has equal slopes from its center point in order to shed precipitation or other particles. A pressure release instrument 42 allows the device 10 to regulate its pressure. The bottom of the vessel 12 having a plurality of non-slip feet 36 for stabilizes the device 10. For additional stability, the base of the vessel 12 measures slightly larger than the top thus creating a larger footprint for stability.

FIG. 3 further shows one embodiment of the 12 vessel enclosing an insulation chamber 52A and 52B holding high-density foam to ensure beverage stay hot or cold for extended periods of time. In alternative embodiments, the capacity of the insulation chamber 52A and 52B is minimized for using vacuum insulation or similar insulation thereby expanding the capacity of the interior liner 50A and 50B to contain and insulate greater quantities of cold or hot liquids. In yet another alternative embodiment, the device 10 is made for smaller groups by having a capacity to hold 1 gallon of liquid and a brewing capacity of up to 64 ounces for serving up to 5 cups of coffee, tea, or other beverages. In the current embodiment, the insulation chamber surrounds the interior liner 50A and 50B. For illustrative purposes, the interior liner 50A and 50B can be more specifically described as the upper interior liner 50A near the filter apparatus 28 and the lower interior reservoir 50B where liquids from the filter apparatus 28 are held and insulated by the insulation chamber 52A and 52B. The floor of the lower interior reservoir 50B retains a degreed slope to direct liquids towards the controlled dispensing device 26 (shown on FIG. 2) without manipulating or tilting the device 10. Additionally, the interior liner 50A and 50B has no corner angles making it easier to clean. A downward angled ledge 54 runs 360 degrees around the sidewall of the upper interior liner 50A. The downward angled ledge 54 provides the proper resting location for the filter apparatus 28 within the upper interior liner 50A. Additionally, the downward angle of the ledge 54 prevents particles from stopping or catching between the bottom of the filter apparatus 28 and the ledge 54 and upper interior liner 50A. In other embodiments, the interior liner 50A and 50B can also utilize a water purification system or similar filtration device for filtrating water impurities while out of doors.

FIG. 3 also illustrating a cross-section view of one embodiment of the removable filter apparatus 28. In the presently contemplated embodiment, the filter apparatus 28 is elliptically shaped. Other configurations are also suitable for alternative embodiments of the filter apparatus 28 such as conical shaped, cylindrical, sieve, multi-angled, or a combination thereof. The contemplated embodiment's large diameter filter apparatus 28 has the capacity to hold a half-pound of coffee grounds or other suitable brew mixtures for brewing up to a gallon of brewed liquids depending the amount of servings desired. In other embodiments, the dimension of the filter apparatus 28 can be configuration to hold more than a half-pound of coffee grounds or less than a half-pound of coffee grounds while maintaining the gravity fed pour over brewing method. The filter apparatus 28 is defined by a plurality of vertical fames 46 and a plurality of horizontal frames 44. The vertical filter frames 46 extend from the top rim of the filter apparatus 28 (below the filter apparatus seal 30) to the horizontal filter frames 44 defining the opposing bottom of the filter apparatus 28. The external side of each vertical frame 46 on the filter apparatus 28 features a vertical locating boss 48 for securing the filter 28 to the sidewalls of the upper interior liner 50A. The filter apparatus frames 44 and 46 employ heat tolerant, non-leaching BPA free materials. Other suitable materials are available for other embodiments of the filter apparatus frames 44 and 46, such as stainless steel, metal, titanium, rubber or other similar materials or combination thereof. The vertical 46 and horizontal 44 filter frames supports a porous mesh further defining the sidewalls and bottom of the filter apparatus 28 between each of the vertical 44 and horizontal 46 frames. The filter apparatus 28 and frames 46 and 44 of the presently contemplated embodiment, supports porous materials comprised of braided, woven, or etched mesh, or similar materials. In other embodiments, the filter 28 material is composed of nylon, gold plated mesh, food grade plastics, paper, perforated metal, or other similar material or a combination thereof. In another embodiment of the filter apparatus 28 the vertical 46 and horizontal 44 filter frames are compressed to support less filter material for holding smaller quantities of brew mixtures. In further embodiments, elongated filter frames 46 and 44 support greater lengths of filter materials for holding larger quantities of brew materials.

As illustrated on FIGS. 2 and 3, the filter apparatus 28 having a handle 32 (FIG. 2) with a snap head boss 40A and 40B (FIG. 3) on either side of the filter handle 32 that plugs into a pass through hole in the filter apparatus 28 allowing the filter handle 32 to fold into a downward position to rest atop the filter apparatus 28 and to fold upward for handling and removing from the vessel 12. In FIG. 2, the filter apparatus 28 also has a flexible filter seal 30 that attaches around the top of rim of the filter apparatus 28. Referring to FIGS. 3 and 4, the filter seal 30 having has a thin blade on the leading edge for sealing to the upper interior liner walls 50A and for shielding particles from releasing over the top of the filter apparatus 28 rim and into the interior liner 50A and 50B. Other suitable alternatives are also available for sealing and securing the filter apparatus 28 within the device 10. Examples include rotating male and female threads, rotational-locking device, latches, clamps, magnetism, or other similar mechanism or combination thereof.

FIG. 4 illustrates the underside side of the lid 14. The lid 14 is made of highly durable, non-leaching BPA free materials. Other suitable materials are also available for alternative embodiments of the lid, such as stainless steel, aluminum, titanium, or similar materials or a combination thereof. The lid having opposing finger slots 16A and 16B for removal and handling, which are also shown on FIGS. 2 and 3. The finger slots 16A and 16B are also designed for securing the vessel with tie downs or rope like device to accommodate easy travel while on a raft, canoe, kayak, horse, RV camper, or other modes of transport. The underside side of the lid 14 is concave 56 to allow brew materials like coffee grounds to rise above the rim of the filter apparatus 28 (shown on FIG. 3) while not attaching to the underside 56 of the lid 14.

To brew coffee or tea in the device 10, remove the lid 14 from the vessel 14 and add brew mixtures into the filter apparatus 28. Pour a liquid, like hot water, over the brew mixtures in the filter apparatus 28 resting within the upper interior liner 50A, and attach the lid 14 to the vessel 12 with the latching devices 20A and 20B. After a sufficient immersion, the brewed liquid will filter through the mesh of the filter apparatus 28 and drips down into the lower interior reservoir 50B. After a sufficient brew time, typically a few minutes, the brewed liquid is ready for consumption. Place a drinking vessel below the controlled dispensing device 26 and engage the controlled dispensing device 26 to dispense the desired amount of brewed beverage. The slope of the lower insulation chamber 50B will direct the brewed liquid towards the interior connection of the controlled dispensing device 26. The insulation chamber 52A and 52B will keep the brewed liquid hot or cold for extended periods for continued enjoyment. Once complete, remove the lid 14 from the latching devices 20A and 20B and vessel 14 to remove the filter apparatus 28 and discard or compost the remaining brew mixture. For insulating cold beverages, the filter apparatus 28 can rest within the vessel 12 or be removed for more liquid capacity within the interior liner 50A and 50B.

Although the present embodiments have been described with a degree of particularity, it is understood that changes in structure and detail may be made without departing from the spirit of the present embodiment as defined in the following claims.

What is claimed is:

1. An insulated multifunctional portable beverage brewing device, comprising:
    a vessel, said vessel including:
        an outer vessel holding a chamber and an interior liner, said outer vessel having a side, a lower end and opposing upper end, said upper end having an opening exposing an inside of said interior liner;
        the outer vessel having a plurality of first recesses located in an outer surface of the outer vessel below said upper end opening; a plurality of latching devices, each located in a respective one of the plurality of first recesses whereby the plurality of latches are recessed with respect to the outer surface of the outer vessel; a lid connecteds to said latching devices when the plurality of latches connect said lid to the interior lining about the opening of the outer vessel;
        a second recess located in the outer surface of the outer vessel towards the lower end of the outer vessel;
        a controlled dispensing device located in the second recess whereby the dispensing device is recessed with respect to the outer surface of the outer vessel, said dispensing device connecting into said interior liner for releasing liquids;
        at least one third recess located in the side of the outer vessel;
        the chamber housing insulation around said interior liner to keep liquids hot or cold;
        a handle positioned in each of the at least one third recess whereby the handle is recessed with respect to the outer surface of the outer vessel, the handle for handling and transport of the device;
        a removable filter apparatus for holding brew mixtures; said filter apparatus having side walls defined by vertical frames that connect to horizontal frames defining an opposing bottom; said vertical and horizontal frames supporting porous materials for filtration; a filter seal attached around a top rim of said filter apparatus for sealing to interior liner walls and for shielding particles contained in the mixtures from releasing over and into said interior liner; said interior liner having an interior ledge for holding said filter apparatus, whereby the filter apparatus brews mixtures in the removable filter apparatus by passing liquid from through the filter apparatus into said interior liner and insulates both hot and cold liquids for dispensing.

2. The device according to claim 1, wherein the filter apparatus having a predetermined size capable of holding quantities of brew mixtures for making up to a gallon of brewed liquids.

3. The device according to claim 1, wherein the porous material is porous mesh.

4. The device according to claim 1, wherein the removable filter apparatus is elliptical and basket shaped.

5. The device according to claim 1, wherein the filter apparatus seal attaching to the top filter rim with a flexible thin blade on the leading edge for sealing to the interior liner sidewalls and shielding particles contained in the brew mixtures from going over the filter into the interior liner.

6. The device according to claim 1, wherein the filter apparatus filter frames have locating bosses for securing to the interior liner sidewalls.

7. The device according to claim 1, wherein the chamber housing insulation comprises of high-density foam for keeping liquids hot or cold.

8. The device according to claim 1, wherein the chamber is adjustable to increase or decrease the capacity of the interior liner.

9. The device according to claim 1, wherein the chamber housing insulation comprises of vacuum insulation for keeping liquids hot or cold.

10. The device according to claim 1, wherein the floor of the interior liner is angled to direct the flow of liquids towards the controlled dispensing device.

11. The device according to claim 1, wherein the interior liner is made of food grade plastics with tolerances for insulating hot and cold liquids.

12. The device according to claim 1, further including a liquid viewing gage connected from the interior liner out to the outer vessel and above the controlled dispensing device, said liquid viewing gage displaying amounts of liquid contained therein.

13. The device according to claim 1, wherein the outer vessel is composed of high-density plastic materials.

14. The device according to claim 1, wherein the lid attaches to the vessel with latches.

15. The device according to claim 1, wherein the outer vessel is comprised of stainless steel.

16. The device according to claim 1, wherein an underside of the lid is concave shaped to prevent brew mixtures from contacting the underside of the lid.

17. The device according to claim 1, further including a filter apparatus having a predetermined size capable of holding quantities of brew mixtures for making over a gallon of brewed liquids.

18. The device according to claim 1, wherein a pressure relief instrument passes through a bottom of the lid to a top of the lid for pressure control.

19. The device of claim 1, further comprising a gasket positioned between said lid and said interior liner to provide a liquid tight seal between the lid and the inner reservoir when the latches are closed.

20. An insulated multifunctional portable beverage brewing device, comprising:
    an outer vessel having an internal chamber and an interior liner positioned in the internal chamber, said outer vessel having a lower end, opposing upper end, and an opening exposing an inside of said interior liner;
    one or more recesses located in an outer surface of the outer vessel;
    a lid;
    one or more connectors connecting the upper end of the outer vessel to the lid to seal said opening of the outer vessel and the interior liner, each of the one or more connectors located in a respective one of the one or more recesses whereby the one or more connectors are flush with or recessed with respect to an outer surface of the outer vessel;

a controlled dispensing device attached towards the lower end of the outer vessel and connecting into said interior liner for releasing liquid contained in the inside of the interior liner;

insulation located in the internal chamber of the outer vessel and around said interior liner to keep liquid in the interior liner hot or cold;

handles on the outer vessel for handling and transport, the handles vertically oriented along a longitudinal axis of the outer vessel;

a removable filter apparatus for holding a brew mixture, said filter apparatus having vertical frames that connect to horizontal frames, said vertical and horizontal frames supporting a porous mesh for filtration; and a filter seal attached around a top rim of said filter apparatus for sealing to an interior ledge of the interior liner;

wherein said device brews the brew mixture without the use of electricity by passing liquid through the brew mixture in the filter into the interior liner.

\* \* \* \* \*